R. S. OGILVY & O. A. WOOD.
RECORDING WEIGHING MECHANISM.
APPLICATION FILED NOV. 13, 1916.
1,249,656.
Patented Dec. 11, 1917.
3 SHEETS—SHEET 1.
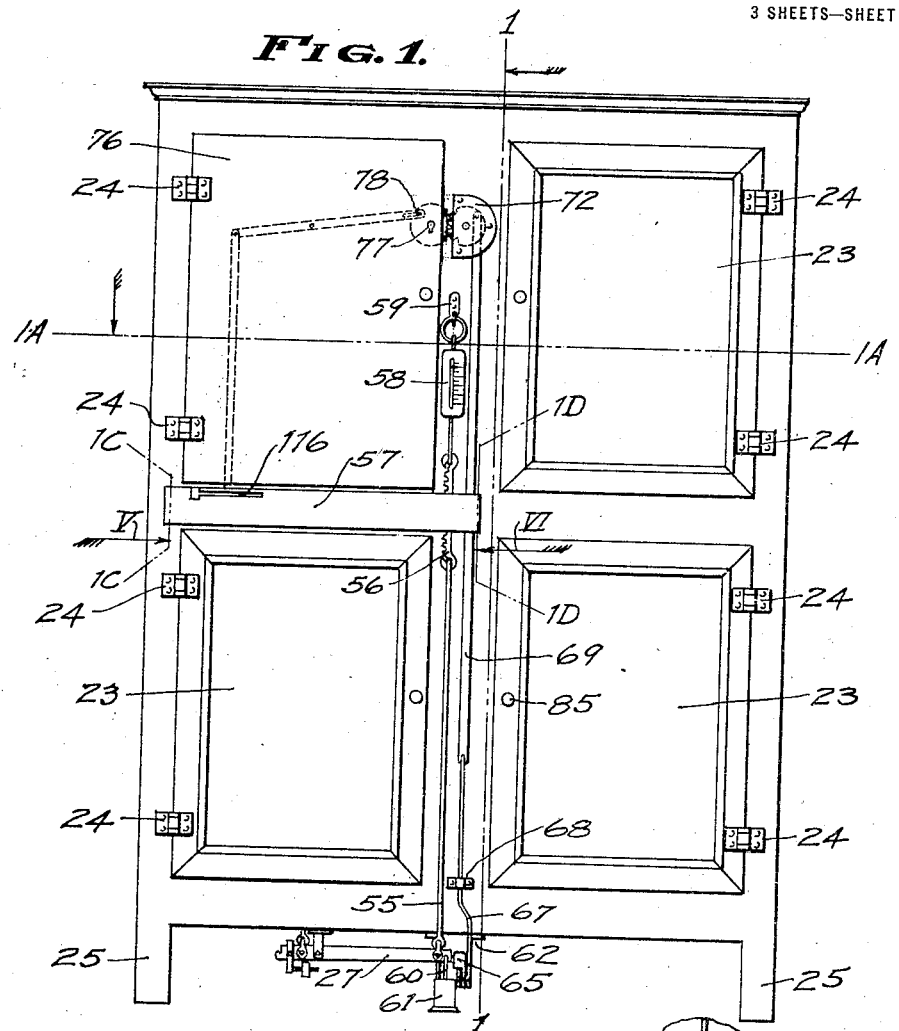
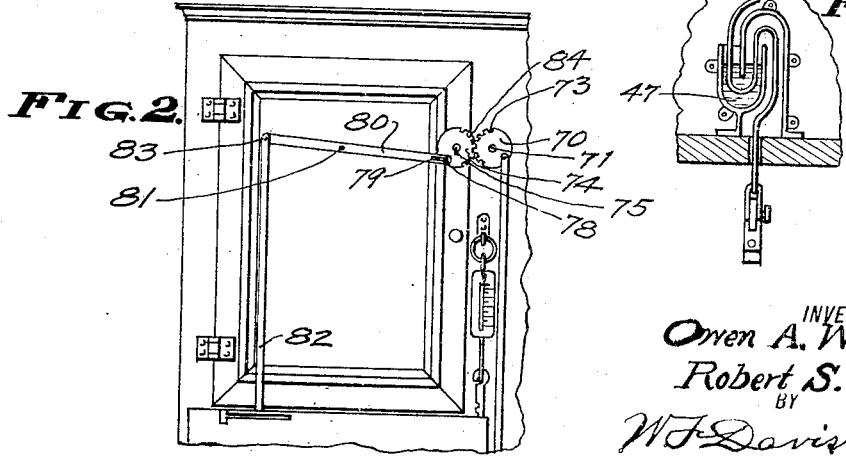
INVENTORS
Owen A. Wood
Robert S. Ogilvy
BY
W. F. Davis & Son
ATTORNEY R. S. OGILVY & O. A. WOOD.
RECORDING WEIGHING MECHANISM.
APPLICATION FILED NOV. 13, 1916.
1,249,656.
Patented Dec. 11, 1917.
3 SHEETS—SHEET 2.
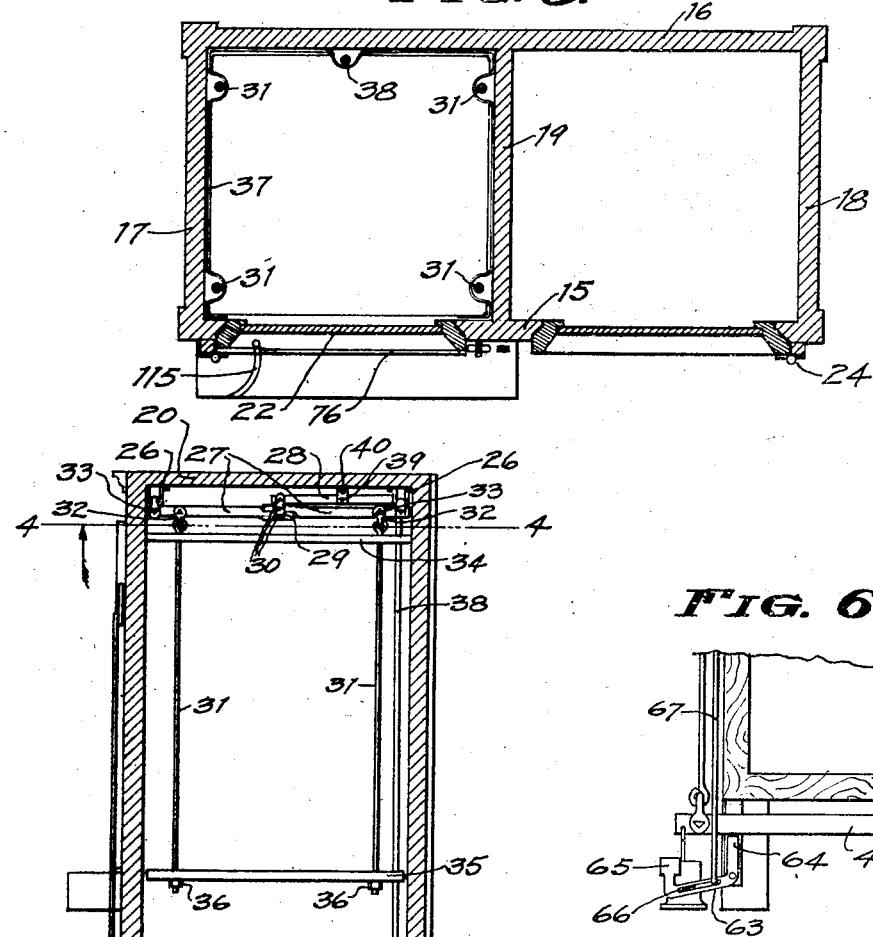
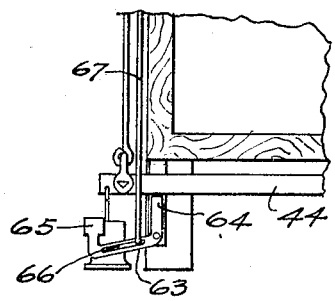
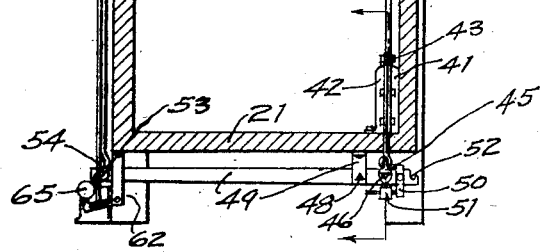
INVENTORS
Owen A. Wood
Robert S. Ogilvy
BY
W. F. Davis & Son
ATTORNEY R. S. OGILVY & O. A. WOOD.
RECORDING WEIGHING MECHANISM.
APPLICATION FILED NOV. 13, 1916.
1,249,656.
Patented Dec. 11, 1917.
3 SHEETS—SHEET 3.
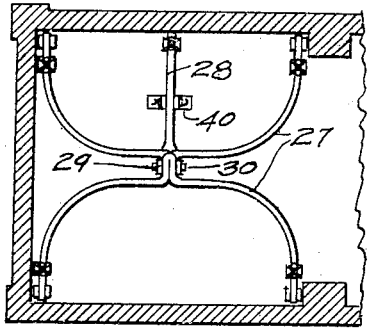
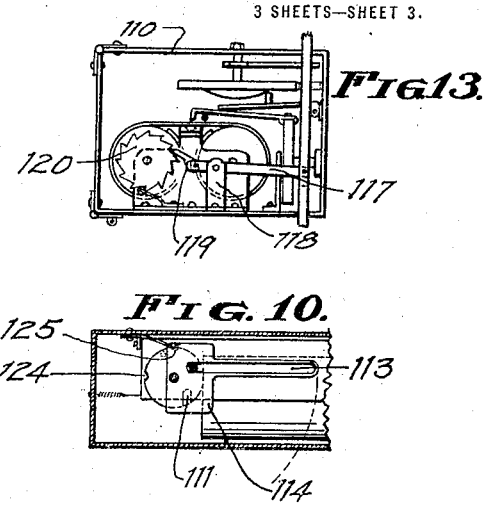
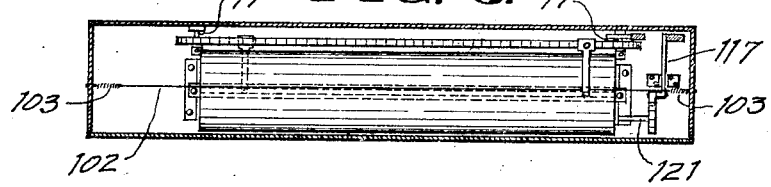
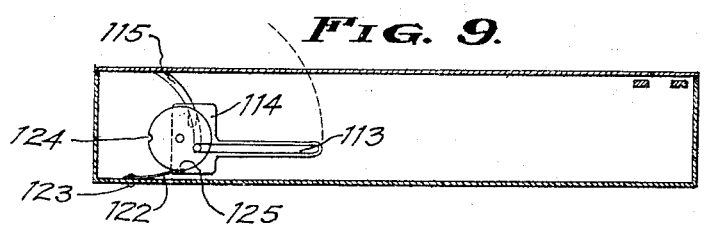
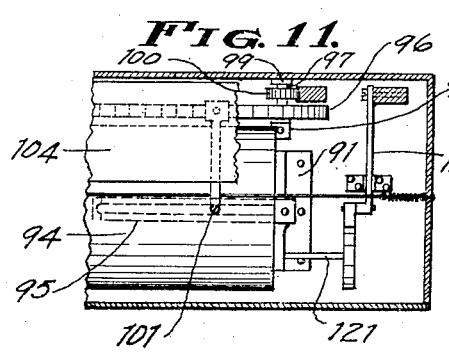
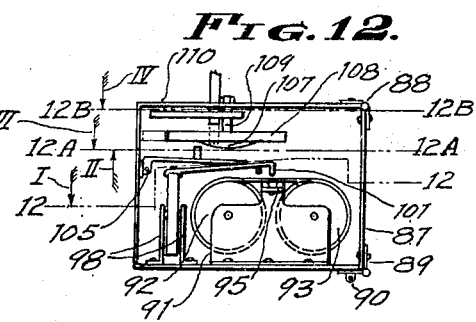
INVENTORS
Owen A. Wood
Robert S. Ogilvy
BY
W. F. Davis & Son
ATTORNEY

UNITED STATES PATENT OFFICE.

ROBERT S. OGILVY, OF KANSAS CITY, MISSOURI, AND OWEN A. WOOD, OF MUSKOGEE, OKLAHOMA.

RECORDING WEIGHING MECHANISM.

1,249,656.  Specification of Letters Patent.  Patented Dec. 11, 1917.

Application filed November 13, 1916. Serial No. 131,019.

*To all whom it may concern:*

Be it known that we, ROBERT S. OGILVY and OWEN A. WOOD, citizens of the United States, residing at Kansas City, in the county of Jackson and State of Missouri, and at Muskogee, in the county of Muskogee and State of Oklahoma, have invented certain new and useful Improvements in Recording Weighing Mechanism, of which the following is a full, clear, and exact description, such as will enable others skilled in the art to which it appertains to make and use the same.

The invention relates to automatically weighing and registering mechanism for refrigerators and seeks to provide a simple and efficient form of mechanism that will automatically weigh ice as it is placed in the refrigerator and record the weight so that the customer as well as the party who delivers the ice will know the weight thereof at any time after the delivery of the ice up to and including one or more subsequent deliveries of ice.

The only scales employed generally heretofore for weighing ice to consumers is placed on the delivery truck so that the consumer rarely if ever is able to, or goes to the trouble of seeing the ice weighed or knowing the quantity delivered. In fact the apparent carelessness in weighing and delivering ice has been such that the consumer often if not usually receives twenty to fifty per cent. less ice than the quantity paid for, the inaccuracy usually if not invariably resulting in favor of the parties who furnish the ice, to the loss of the consumer.

The present invention seeks to provide a simple and efficient weighing and registering mechanism that will automatically weigh the ice as it is placed in the refrigerator and record the weight so that the party who delivers the ice can check the weight and the consumer can at leisure check and know the weight thereof even after successive deliveries have been made.

By recording the weight the refrigerator can be replenished in the absence of the consumer and the latter can subsequently check the weight even after several deliveries have been made which would ordinarily consume as many days.

With these and other objects in view the invention consists in the features of construction, combinations and arrangements of parts hereinafter set forth, illustrated in the accompanying drawings and more particularly pointed out in the appended claims.

In the drawings:—

Figure 1 is a view in elevation of a refrigerator with the improved weighing and recording mechanism attached.

Fig. 2 is a fragmentary view from the same view point as Fig. 1, with the cover plate removed from the mechanism operating door, to more clearly show the connection of the door and the mechanism.

Fig. 3 is a fragmentary view in elevation of the interior of the refrigerator, and a view of the trap through which the scales connect to the exterior of the refrigerator, the cover being removed from the trap.

Fig. 4 is a sectional view taken on line 1—1 of Fig. 1.

Fig. 5 is a sectional view taken on line 1ᴬ—1ᴬ of Fig. 1.

Fig. 6 is an enlarged fragmentary sectional view taken on line 1—1 of Fig. 1, but with certain parts removed.

Fig. 7 is a sectional view taken on line 4—4 of Fig. 4.

Fig. 8 is a sectional view taken on line 12—12 of Fig 12, looking in the direction of arrow I.

Fig. 9 is a sectional view taken on line 12ᴬ—12ᴬ of Fig. 12 looking in the direction of arrow II.

Fig. 10 is a fragmentary sectional view taken on line 12ᴮ—12ᴮ of Fig. 12, looking in the direction of arrow IV.

Fig. 11 is an enlarged sectional view taken on line 12ᴬ—12ᴬ of Fig. 12, looking in the direction of arrow III.

Fig. 12 is an enlarged sectional view taken on line 1ᶜ—1ᶜ of Fig. 1, looking in the direction of arrow V.

Fig. 13 is an enlarged sectional view taken on line 1ᴰ—1ᴰ of Fig. 1, looking in the direction of arrow VI.

The refrigerator comprises front wall 15, rear wall 16, end walls 17 and 18, division wall 19, cover 20, bottom wall 21, doors 22 and 23, hinges 24, and legs 25, all of which is of common and well known construction.

From the cover 20 depends the hangers 26, to which are pivoted in the usual manner the scale levers 27, the lever 28 being pivoted to the levers 27 by the links 29 and triangular pins 30.

The rods 31 are connected to the beams 27 by the clevises 32 and triangular pins 33 and depend therefrom, the plate 34 fitting around the rods and forming a cover for the ice receiving compartment, while the plate 35 also fits around the rods and is supported by the nuts 36, forming a bottom wall of the compartment and a receptacle for the ice which is placed thereon but not shown because of its not being any part of the mechanism.

The compartment to receive ice is formed of the cover plate 34, bottom plate 35, rear wall 16, end wall 17 and division wall 19, and is lined by the lining 37 preferably of metal, the latter protecting the rods 31 and rod 38 from any ice that may be placed on the plate 35, and forming a compartment with smooth but irregular walls.

The lever 28 is fulcrumed by the pin 39 in the hanger 40 and has depending therefrom the rod 38 which passes through to trap formed of separable parts 41 and 42 secured together by the bolts 43 and the bottom wall 21, connecting to the lever 44 by the clevis 45 and pin 46, the trap being partly filled with liquid, preferably oil, as shown by the shading lines 47, and preventing warm air from entering the refrigerator around the rod 38.

The lever 44 is fulcrumed on the pin 48 in the bracket 49 and is provided with the bracket 50 and balancing nut 51, and the hook 52 for the purpose of receiving additional weight should it be necessary to balance the scales.

To the lever 44 is pivoted by pin 53 the clevis 54 to which is connected the rod 55, the latter passing upward and connecting to the rack 56, the rack passing through the mechanism housing 57 and connecting to the scales 58 which are suspended by the hook 59 from the front wall 15 of the refrigerator, the dashpot rod 60 also connects to the lever 44 and to the ordinary dashpot 61 to prevent undue vibration of the lever.

Secured to and depending from the bottom wall 21 are the brackets 62 in which is pivoted the lock arm 63, with the lock heel 64 and weight 65, the arm having therein the slot 66 in which the bent rod 67 connects, the rod being held in operative position by the bracket 68 and connected to the bar 69, while the bar passes upward through the housing 57 and is pivotally connected to the disk 70, the latter being mounted on the pin 71 in the plate cover 72 and provided with the gear teeth 73, the lock arm 63 being shown in locked position in Fig. 1 and unlocked position in Figs. 4 and 6.

The disk 74 is pivoted centrally thereof to the door 22 and provided with the gear teeth 84 which mesh with the gear teeth 73, and with the key hole 75, and held in position by the cover plate 76 also provided with the key hole 77 which registers with the key hole 75 when the mechanism is in locked position.

The pin 78 is secured in the disk 74 and positioned in the slot 79 in the lever arm 80, the latter being pivoted to the door 22 at 81, the remaining end of the lever arm being pivoted to the mechanism engaging rod 82 at 83.

Each of the doors 23 and the door 22 is provided with the knob 85 and the usual means of latching the doors in closed position, the latching means being omitted because of common and well known construction, the knobs referred to being deemed sufficient illustration.

The mechanism housing 57 is preferably formed of sheet metal and provided with the door 87, hinged at 88 as a means of access thereto for the purposes that will appear hereinafter, the hasp 89 and eye bolt 90 being provided for the purpose of locking the housing closed by any ordinary means as a pad lock.

Within the housing 57 are the bearing stands 91 in which are journaled the rollers 92 and 93 on which is mounted the record sheet 94, the sheet being secured to the rollers in any convenient or usual manner so that it may easily be removed when filled with record markings and replaced by unrecorded sheets.

Between the rollers 92 and 93 and immediately below the sheet 94 is the slotted bar 95, supported by the bearing stands 91, this bar being for the purpose of supporting the record sheet while the mechanism is effecting registration thereon.

The sprocket chain 96 is mounted on ordinary sprocket wheels not separately illustrated because of common and well known construction, the wheels however are mounted on the shafts 97 which are journaled in the stands 98 and bearing box 99, the shaft 97 adjacent the rack bar 56 has mounted thereon, the pinion 100 which meshes with the rack bar so that any vertical movement of the rack bar will revolve the pinion and shafts and cause the chain to traverse the sprocket wheels, the movement of the chain relative to the rack bar being so regulated that the punch 101 is in the position as shown in full lines of Fig. 8 when no ice or other weight is on the plate 35, the punch being carried by the chain to the position shown in dotted lines of the same figure when the plate 35 is sufficiently loaded, it being understood that intermediate loads will position the punch intermediately of the positions illustrated, the chain being driven considerably faster and farther than the movement of the rack bar so that more room will intervene between the positions of the punch with the variation of load on the plate 35.

The punch 101 is resiliently suspended above the register sheet 94 by the rod 102 and springs 103, the leaf 104 being hinged at 105 and always resting by gravity on the punch, the leaf extending beyond the travel of the punch in both directions so that in any operative position of the punch the leaf will rest thereon, the leaf as well as the punch being supported by the rod 102 and springs 103.

The leaf 104 has rigidly secured therein and extending upward therefrom, the pin 106 which is positioned in the semi-rotary path of the cam point 107, the latter being preferably as shown integral with the disk 108, the latter journaled on the stud pin 109 extending downward from the upper wall 110 of the housing 57.

The disk 108 as shown in Figs. 9, 10, 12 and 13 is in normal position as it is when the door 22 is closed and is provided with the slot 111 which is in alinement with the mechanism housing 57 and with the slot 113 in the protecting plate 114 which is pivoted upon the stud-pin 109 and extends through the slot 116. In this position the plate 114 covers the disk 108 so that it cannot easily be turned by any one attempting to render the mechanism inoperative, the mechanism engaging rod 82 always being in engagement with the plate 114, the view Fig. 12 representing this rod in extreme elevated or withdrawn position.

The mechanism housing 57 is provided with the slot 115 which is positioned concentric to the pivotal center of the hinges 24 of the door 22 so that the mechanism engaging rod 82 will when the door 22 is opened traverse the slots 113 and 115 and if the door be opened approximately ninety degrees or more the rod will leave the housing, but the protecting plate 114 will be carried with the rod, as it is never disengaged therefrom, the plate 114 shielding the slot 115 to prevent the insertion of instruments to interfere with the operation of the mechanism within the housing 57.

To the bar 69 is pivoted the lever 117 which in turn is pivoted in the stand 118 and has pivoted thereto, the pawl 119, the latter positioned to engage the ratchet wheel 120, the ratchet wheel being rigidly mounted on the shaft 121 extending from the roller 93 and rigid therewith, it being understood that the roller is rotated slightly each time the bar 69 is lowered.

The spring 122 is secured to the mechanism case 57 at 123 and arranged to engage the notches 124 and 125 in the cam disk 108 to prevent the latter from rotating only when forced against the retarding force of the spring by the mechanism engaging rod 82.

Normally the disks 70 and 74 are in the position shown in Fig. 2, with the lock arm 63 in the positions illustrated in Figs. 4 and 6, the heel 64 of the lock arm holding the lever 44 in rigid position so that any weight as ice placed on the plate 35 will not register on the scales 58, and the punch 101 will not be advanced by the sprocket chain 96 from normal position as shown in full lines of Fig. 8.

The door 22 may be opened and closed at will while the disks 70 and 74 are in the position illustrated in Fig. 2 and the mechanism will not register, therefore the refrigerator can be employed and manipulated as usual, the same as though the automatic weighing and recording mechanism were not attached thereto.

When the mechanism is attached as illustrated the ice delivery man will be required to insert a key in the key holes 77 of the plate 76 and 75 of the disk 74 and turn the disks and accompanying parts from the position illustrated in Fig. 2, to that illustrated in Fig. 1, and by so doing the mechanism engaging rod 82 will be lowered from the position thereof shown in full lines of Fig. 12 to that of the dotted lines of the same figure, also the lock arm 63 will be raised and the heel 64 of the lock arm removed from engagement with the lever 44 allowing the entire scales and connecting mechanism to assume operative position. At the same time the ratchet pawl 119 will be raised on the ratchet wheel 120 so that it will be in position to turn the wheel on the reverse motion of the parts and before the key can be withdrawn from the key hole.

The door is then opened and as it opens the mechanism engaging rod 82 traverses the slot 115 and rotates the cam disk 108 approximately ninety degrees, the cam point 107 depressing the pin 106 and the leaf 104 and driving the punch 101 through the record sheet 94, during the first approximately forty five degrees of revolution of the cam disk 108, the cam point leaving the pin and releasing the punch during the next approximately forty five degrees revolution of the cam disk 108, allowing the rod 102 and springs 103 to withdraw the punch from the register sheet.

When the door 22 has been opened a distance that will rotate the cam disk 108 sufficiently to advance the slot 111 from the position shown in full lines of Figs. 9 and 10 to that of the dotted lines of the same figures, the engaging rod 82 passes from the disk 108 and the spring 122 engaging the notch 125 holds the disk from rotating while the door 22 is opened to any desired distance and returned to a position that will allow the engaging rod 82 to again enter the slot 111.

The door having been opened and the punch having punctured the record sheet 94 the ice is placed on the plate 35.

It will be understood that if a quantity of ice or other articles were on the plate 35 the punch would have been in a position that would indicate the weight thereof on the register sheet.

When the ice is placed on the plate 35 the weight is indicated on the scales 58 and the rack bar 56 rotates the pinion 100 and advances the punch 101 a distance along the register sheet 94 that will indicate the total number of pounds on the plate 35, the ratio of travel between the rack bar and the chain being sufficient to allow space between the punch marks of any ordinary difference in weight, and in the drawings this ratio is shown to be about six to one, the chain and punch advancing about six times as fast and six times as far as the movement of the rack bar.

When the ice has been placed on the plate 35 the door 22 is closed and during the closing movement of the door the disk 108 is returned to normal position and the punch 101 is forced by the cam point 107 and the leaf 104 to perforate the record sheet 94 indicating the full amount of ice and other articles on the shelf 35 at the time of closing the door.

After the door 22 is closed the key is turned to a position that will register with the key hole 77 in the cover plate 76 and then withdrawn, and the turning of the key to this position returns the disks 70 and 74 and all connecting mechanism to the original position, locking the beam 44, turning the ratchet wheel 120 one tooth, advancing the record sheet 94 to a new position and withdrawing the engaging rod 82 from the disk 108 so that the door can be opened and closed at will without in any way effecting or operating any part of the weighing and recording mechanism.

The reason for recording on the record sheet 94 the weight of ice and other articles on the shelf 35 when the door is opened and again recording the weight thereon when the door is closed is to show the amount of weight on the receptacle before delivery is made and then show the total amount of weight on the receptacle, it being well understood that the amount of weight on the receptacle before delivery, taken from the total amount after delivery will show the amount of ice delivered, and this amount is indicated on the record sheet 94 by the distance between the punch marks, it being further understood that the record sheet can be marked with lines and figures that will indicate at a glance the amount of any delivery, even after several deliveries have been made.

The weighing and recording mechanism is of great advantage for the purpose of eliminating the heretofore careless manner of weighing and delivering ice, and in many cases it will save the consumer from twenty to fifty per cent. in ice bills by compelling the supplier to charge only for the amount of ice delivered to the consumer.

A further advantage is gained by apprising the consumer at all times of the quantity of ice that has been delivered, so that the amount of ice required on future orders can be computed more intelligently.

What we claim as new, and desire to secure by Letters Patent is:—

1. In automatic weighing and recording mechanism for refrigerators, a refrigerator, a scale platform within said refrigerator, an automatic recording mechanism controlled by the refrigerator door to make permanent records of the weights on said platform and suitable connections connecting said platform to said recording mechanism.

2. In automatic weighing and recording mechanism for refrigerators, a refrigerator, an ice receptacle within said refrigerator, suitable connections connecting said receptacle to a recording mechanism, a recording sheet in said recording mechanism, and means in said recording mechanism automatically controlled by the refrigerator door to record the weight on said recording sheet of any weight placed on said receptacle.

3. In automatic weighing and recording mechanism for refrigerators, a refrigerator, a suspended receptacle in said refrigerator, suitable connections connecting said receptacle to a recording mechanism, a recording sheet in said recording mechanism, and means in said recording mechanism automatically controlled by the refrigerator door to record on said recording sheet the weight of ice placed on said receptacle, and means to automatically record on said sheet any additional weight placed on said receptacle.

4. In automatic weighing and recording mechanism for refrigerators, a refrigerator, an ice receptacle within said refrigerator, said receptacle suspended by levers, a scale, connections from said lever to said scale on the exterior of said refrigerator, a recording mechanism operated by said connections, a recording sheet in said recording mechanism, and means connecting to the door of said refrigerator to automatically record on said recording sheet the weight placed on said receptacle.

5. In automatic weighing and recording mechanism for refrigerators, a refrigerator, an ice receptacle within said refrigerator, connections connecting said receptacle to a recording mechanism on the exterior of said receptacle, a recording sheet in said recording mechanism, a door leading to said receptacle, and a detachable means connecting said door to said recording mechanism whereby the weight on said receptacle is recorded on said recording sheet by the opening of said door.

6. In automatic weighing and recording mechanism for refrigerators, a refrigerator, an ice receptacle within said refrigerator, a door forming access to said receptacle, connections connecting said receptacle to a recording mechanism on the exterior of said refrigerator, a recording sheet in said recording mechanism, a detachable connection connecting said door to said recording mechanism, means whereby the weight carried by said receptacle before the opening of said door is recorded on said sheet by the opening of said door, means whereby the weight carried by said receptacle at the time of closing said door is recorded in said sheet by the closing of said door.

7. In weighing and recording refrigerators, a refrigerator, a receptacle within said refrigerator, weighing and recording mechanism mounted on the exterior of said refrigerator, a connection passing through the wall of said refrigerator and connecting said receptacle to said weighing and recording mechanism, and a trap surrounding said connection and sealing against the admission of air to the interior of said refrigerator.

8. In weighing and recording mechanism for refrigerators, a refrigerator, a receptacle within said refrigerator, a door leading to said receptacle, a disk mounted on said refrigerator, a disk mounted on said door, engageable teeth rotatably connecting said disks, a recording mechanism mounted adjacent said door, a weighing scale mounted adjacent said door, a rack bar connecting to said scale and passing through the housing of said recording mechanism, connections from said rack bar to said receptacle, connections connecting to the disk mounted on said refrigerator and arranged to lock and unlock the connections which connect said receptacle and said rack bar, connections arranged to connect and disconnect the disk mounted on said door respectively to and from said recording mechanism, a cover covering the disk mounted on said door, a key hole in said cover and a key hole in the disk mounted on said door.

9. In weighing and recording mechanism for refrigerators, a refrigerator, a receptacle in said refrigerator, a weighing scale mounted on said receptacle, connections connecting said scale and said receptacle, a housing mounted on said refrigerator, a pair of rolls in said housing, a recording sheet on said rolls, a punch arranged to traverse said rolls a distance representing the weight carried by said receptacle, a cam positioned to depress said punch, a rod on said door, said rod disengaged from said cam in inoperative position, and said rod engaging said cam in operative position.

10. A refrigerator, a pair of disks mounted on said refrigerator, a weighing mechanism attached to said refrigerator, a recording mechanism mounted on said refrigerator, means connecting said weighing mechanism and said recording mechanism, means to oscillate said disks simultaneously, and means whereby when said disks are in one position said door can be opened and closed without operating said recording mechanism, said means operating said recording mechanism when said disks are in the opposite oscillatable position.

11. A refrigerator, a weighing mechanism attached to said refrigerator, a recording mechanism attached to said refrigerator, a receptacle in said refrigerator, connections connecting said recording mechanism and said weighing mechanism, connecting means connecting said receptacle to said weighing mechanism, and a latch on said door to engage and operate said recording mechanism by the opening and closing of said door and allow the opening and closing of said door without operating said recording mechanism, when said latch is in reverse position.

12. A refrigerator, a receptacle in said refrigerator, a weighing mechanism connecting to said refrigerator, a recording mechanism connecting to said weighing mechanism, a door leading to said receptacle, and a reversible engageable means mounted on said door whereby in one position of said engageable means said door can be opened and closed without operating said recording mechanism and in the reverse position of said engageable means said door will operate said recording means as said door is opened and as said door is closed.

13. In recording weighing mechanism, a receptacle, suitable connections connecting said receptacle to a weighing scale, a rack bar in said connections, a pinion meshing with said rack bar, an endless chain operated by said pinion, a punch carried by said chain, a record sheet adjacent said punch, said rack bar and pinion and chain always spacing said punch in a position adjacent said record sheet that will represent the weight on said receptacle, and means to cause said punch to perforate said record sheet.

14. In recording weighing mechanism, a receptacle, suitable connections connecting said receptacle to a weighing scale, a rack bar in said connections, a pinion meshing with said rack bar, an endless chain operated by said pinion, a punch carried by said chain, a record sheet adjacent said punch, said rack bar and pinion and chain always spacing said punch in a position adjacent said record sheet that will represent the weight on said receptacle, a structure inclosing said receptacle, a door in said structure, and means connecting said door to said punch whereby said punch is carried to perforate said record sheet as said door is opened and as said door is closed.

ROBERT S. OGILVY.
OWEN A. WOOD.